United States Patent [19]

Larsen

[11] 4,377,596

[45] Mar. 22, 1983

[54] METHOD FOR INCREASING MILK PRODUCTION

[75] Inventor: Howard J. Larsen, Marshfield, Wis.

[73] Assignee: Wisconsin Alumni Research Foundation, Madison, Wis.

[21] Appl. No.: 178,509

[22] Filed: Aug. 15, 1980

Related U.S. Application Data

[63] Continuation of Ser. No. 89,992, Oct. 31, 1979, abandoned, which is a continuation of Ser. No. 877,860, Feb. 15, 1978, abandoned.

[51] Int. Cl.$^3$ .............................................. A23K 1/12
[52] U.S. Cl. ...................................... 426/2; 426/623; 426/630; 426/635; 426/658; 426/807
[58] Field of Search .................... 426/2, 658, 74, 635, 426/623, 807, 630

[56] References Cited

U.S. PATENT DOCUMENTS

| | | | |
|---|---|---|---|
| 2,715,067 | 8/1955 | Kamlet | 426/635 |
| 2,905,558 | 9/1959 | Adams | 426/635 |
| 3,035,920 | 5/1962 | Knodt | 426/74 |
| 3,251,716 | 5/1966 | Porter | 426/635 |

*Primary Examiner*—R. B. Penland
*Attorney, Agent, or Firm*—McDougall, Hersh & Scott

[57] ABSTRACT

This invention is addressed to the increase in milk production of dairy cows, and particularly high producing dairy cows, by inclusion in their feed of an amount of waste sulfite liquor which does not exceed 5% by wet weight and is present preferably within the range of 0.5–4% by wet weight.

3 Claims, No Drawings

METHOD FOR INCREASING MILK PRODUCTION

This is a continuation, of application Ser. No. 89,992 filed Oct. 31, 1979, which is a continuation of application Ser. No. 817,860, filed Feb. 15, 1978 both, now abandoned.

This invention relates to a method for increasing milk production of dairy cows and particularly high producing dairy cows in early lactation.

In accordance with the practice of this invention, milk production of dairy cows can be increased considerably, without loss in the quality of the milk or milk fat content, by inclusion in the diet of calcium, magnesium or ammonia based sulfite liquor produced as a by-product in the manufacture of cellulose pulp in the wood process and paper making industry, and in which the calcium, magnesium or ammonia based sulfite liquor is interchangeably referred to in the trade as spent sulfite liquor or ligno sulfonate.

While spent sulfite liquor from the wood industry can be used as is, it is desirable to concentrate the liquor by boiling down to a syrup having a concentration of about 60–50% by weight dry solids. Spent sulfite liquors contain wood sugars and related materials which are modified during the cooking process to make them digestible. A typical concentrate contains approximately 48% by weight digestible energy on a dry solids basis, composed of about 26% by weight wood sugars, 19% by weight other carbohydrates, and 3% by weight gums or waxes. Analysis indicated the additional presence on the dry solids basis of approximately 3.5% by weight calcium in calcium based liquors or corresponding amounts of magnesium in magnesium based liquors, and corresponding amounts of ammonia in ammonia based liquors, 5.0% by weight sulphur, 0.88 by weight phosphate, 0.17% by weight potassium, a total ash content of 10% by weight, and 42% by weight lignin.

Such spent sulfite liquors have further beneficial use in the feed of beef cattle as a concentrate binder and supplemental energy source, in substitution for molasses, as described in U.S. Pat. No. 3,035,920. However, use has not been made of such spent sulfite liquors in feed for dairy cows and it was wholly unexpected that such spent sulfite liquors would have a beneficial effect on milk production when included in the diet of milk cows.

Dairy cows and particularly high producing dairy cows are very sensitive animals and almost any change will have a deleterious effect on milk production. This increase in milk production is incapable of being obtained by direct feeding of the sulfite liquors as a concentrate. Instead, it should be included as a component with the normal feed and even then it is limited to an amount which does not exceed 5% by weight of the feed, and preferably an amount which does not exceed 3% of the wet material by weight of the feed. Even then, initiation in the feed should start with a low amount gradually to accustom the dairy cows to the odor and flavor of the new mixture. The amount admixed with the feed can then be increased gradually, such as over a period of two to three weeks, depending upon the age of the cow, until the desired concentration of 3–4% by weight of the feed, on a wet basis or 1.5 to 2.4% on a dry weight basis is reached. Thereafter, the dairy cows take the feed and in fact, for reasons which will hereinafter be described, may consume more than usual.

In one set of experiments, with high producing dairy cows, consumption of approximately 45 pounds of feed per cow per day, successful introduction of calcium based sulfite liquor concentrate was effected by mixing 0.1 pound of the liquor concentrate per day per cow to dry cows and then gradually increasing the amount of the liquor over a three week period to 1.3 pounds per cow per day near the peak of lactation.

The described effect of calcium based sulfite liquor in the feed of dairy cows has been established by comparative tests. An experiment station with a high producing dairy herd was used as the test site. Five pairs of cows were selected with matched producing ability, body weight, and stage of lactation. One member of each pair was randomly assigned to the experimental diet and the other member of each pair was assigned to the control diet formulated as follows:

| Ingredients | Pounds |
|---|---|
| Corn Cob | 1200 |
| Oats | 850 |
| Barley | 400 |
| Soya Bean Oil Meal | 400 |
| Dry Molasses | 50 |
| Trace Mineral Salts | 30 |
| Dicalcium Phosphate | 45 |
| Vitamins A, D & E | 3 |

The experimental diet, representative of the features of this invention, was identical to the above control diet except that approximately 50 pounds of dry molasses was replaced with 90 pounds of spent calcium based sulfite liquor (57–58% solids) of the composition previously described. This corresponded to 50 pounds on a dry solids basis, or 3% on a wet basis.

The rations were mixed in a suitable blender preferably within one day prior to feeding.

One cow of each matched pair was given the control diet with molasses and the other cow of each matched pair was fed the experimental diet containing the sulfite liquor. All other conditions of feed time, feed location environment, etc. were the same. Each cow was fed forage on an ad lib basis and concentrate for maximum milk production.

The cows were started on their respective diets two weeks prior to freshening and kept on their respective diets for approximately 21 weeks. Observations were made continuously as to palatability, daily dry matter intake, daily milk production, health, breeding observations and monthly fat tests, with the following results:

TABLE 1

MILK PRODUCTION AND DRY MATTER CONSUMPTION (LB) SUMMARY

| | Pair | CONTROL - DRIED MOLASSES ||||| EXPERIMENTAL - SULFITE LIQUOR ||||||
|---|---|---|---|---|---|---|---|---|---|---|---|---|
| | | Cow No. | Hlg Dry | Conc Dry | Total Dry | Milk FCM | Cow No. | Hlg Dry | Conc Dry | Total Dry | Milk FCM | Liquor Sulphite |
| Weekly | 1 | 1090 | 155.6 | 156.0 | 311.6 | 415.7 | 1086 | 190.6 | 146.2 | 336.8 | 380.2 | 4.96 |
| Mean | 2 | 1105 | 130.8 | 130.3 | 261.1 | 332.8 | 1108 | 129.7 | 130.5 | 260.1 | 372.8 | 4.69 |
| Per | 3 | 1093 | 169.9 | 137.6 | 307.6 | 392.1 | 1094 | 162.5 | 132.4 | 294.9 | 388.5 | 4.49 |

TABLE 1-continued
MILK PRODUCTION AND DRY MATTER CONSUMPTION (LB) SUMMARY

| | Pair | CONTROL - DRIED MOLASSES | | | | | EXPERIMENTAL - SULFITE LIQUOR | | | | | |
|---|---|---|---|---|---|---|---|---|---|---|---|---|
| | | Cow No. | Hlg Dry | Conc Dry | Total Dry | Milk FCM | Cow No. | Hlg Dry | Conc Dry | Total Dry | Milk FCM | Liquor Sulphite |
| Pair | 4 | 1004 | 188.6 | 121.7 | 310.4 | 343.1 | 1040 | 178.8 | 160.9 | 339.7 | 442.0 | 5.57 |
| | 5 | 903 | 183.9 | 154.0 | 337.9 | 408.5 | 955 | 173.7 | 198.0 | 371.7 | 645.0 | 6.65 |
| Daily | 1 | 1090 | 22.2 | 22.3 | 44.5 | 59.4 | 1086 | 27.2 | 20.9 | 48.1 | 54.3 | .71 |
| Mean | 2 | 1105 | 18.7 | 18.6 | 37.3 | 47.5 | 1108 | 18.5 | 18.6 | 37.2 | 53.3 | .67 |
| Per | 3 | 1093 | 24.3 | 19.7 | 43.9 | 56.0 | 1094 | 23.2 | 18.9 | 42.1 | 55.5 | .64 |
| Pair | 4 | 1004 | 26.9 | 17.4 | 44.3 | 49.0 | 1040 | 25.5 | 23.0 | 48.5 | 63.1 | .80 |
| | 5 | 903 | 26.3 | 22.0 | 48.3 | 58.4 | 985 | 24.8 | 28.3 | 53.1 | 92.1 | .95 |
| Overall Daily Mean | | | 23.7 | 20.0 | 43.7 | 54.1 | | 23.8 | 21.9 | 45.8 | 63.7 | |

TABLE 2
DRY MATTER CONSUMPTION (LB) AS RELATED TO BODY WEIGHT AND MILK PRODUCTION

| Control-Dried Molasses | | | | | | Sulfite Liquor | | | | | |
|---|---|---|---|---|---|---|---|---|---|---|---|
| Cow No. | Body Wt Begin | Body Wt End | Mean Body Wt | DM/ CWT | DM/Lb FCM | Cow No. | Body Wt Begin | Body Wt End | Mean Body Wt | DM/ CWT | DM/Lb FCM |
| 1090 | 1234 | 1319 | 1277 | 3.49 | .75 | 1086 | 1345 | 1490 | 1420 | 3.39 | .89 |
| 1105 | 1376 | 1437 | 1407 | 2.86 | .85 | 1108 | 1179 | 1110 | 1145 | 3.38 | .73 |
| 1093 | 1191 | 1258 | 1225 | 3.59 | .78 | 1094 | 1167 | 1334 | 1251 | 3.37 | .76 |
| 1004 | 1435 | 1628 | 1532 | 2.89 | .90 | 1040 | 1327 | 1469 | 1398 | 3.47 | .77 |
| 903 | 1411 | 1574 | 1493 | 3.23 | .83 | 985 | 1579 | 1515 | 1547 | 3.62 | .61 |
| Mean | 1329 | 1443 | 1387 | 3.21 | .82 | | 1319 | 1384 | 1352 | 3.45 | .75 |

In the above tables "Hlg Dry" means hay crop silage dry matter fed separately: "Conc Dry" refers to the dry feed concentrate in which no spent sulfite liquor is added for feeding to one of each pair of cows and in which 3% by wet weight spent sulfite liquor concentrate is incorporated in the feed for the other of said pair of cows: "Total Dry" refers to the total dry Haylage (Hlg) plus concentrate: "DM/CWT" is dry matter consumed per hundred weight of body weight and "DM/Lb FCM" refers to dry matter required per pound of fat corrected milk (FCM).

A number of important characteristics are indicated by the experimental data that has been collected and shown in Table 2. Significant is the increase of 9.6 pounds of fat corrected milk obtained and the 2.1 pounds increase in the feed dry matter consumed by cows on the experimental feed containing spent sulfite liquor as compared to cows on the control. This represents 17.7% milk production having an increase in the feed of 4.8% by weight dry matter with cows on the experimental feed as compared to the control. The average pound per cow per day of fat corrected milk increased from 54.1 pounds per cow per day on the control feed to 63.7 pounds per cow per day for the cows on the experimental feed containing the spent sulfite liquor.

This improvement is further supported by the data obtained on the amount of dry matter consumed per pound of fat corrected milk production. As shown in Table 2, one pound of fat corrected milk was produced per 0.75 pounds of dry experimental feed as compared to 0.82 pounds of control feed.

While the exact remains for such improvement in milk production and increased feed consumption have not been established, there is reason to believe that the lignin present in the spent sulfite liquor operates to protect the proteins in the feed from being destroyed by microorganisms present in the cows' first three stomachs. Thus the proteins are saved for digestion in the lower digestive tract where the proteins can be more efficiently used.

Further, the five carbon wood sugars present in the spent sulfite liquor, as compared to the six carbon sugars in molasses, may assist in better digestion of the materials present in the grain and roughage common to both feeds.

It may be for these reasons and/or other reasons that dairy cows on the experimental feed were able to consume more feed and, more importantly, to convert increased amounts of feed into an unexpectedly large increase in the amount of milk production.

No detrimental effects on the producing dairy cows was observed from use of experimental feed. Neither breeding efficiency nor the general health of the cows showed any problems that might have been attributed to the inclusion of spent sulfite liquors in the feed, especially when restricted to amounts less than 4–5% by wet weight and preferably to an amount that does not exceed 3% by wet weight. Beneficial improvements are not apparent when the amount of spent sulfite liquor in the feed is less than 0.5% by wet weight.

It will be apparent from the foregoing that there is provided a means for increasing the milk production from dairy cows using spent sulfite liquors which represent a waste in the wood processing industry and often presents problems of disposal.

I claim:

1. In a method of feeding high producing dairy cows having an average milk production of at least 54 pounds of fat corrected milk per day the improvement consisting of feeding said dairy cows a nutritionally balanced feed containing spent sulfite liquor in an amount of 0.25–3.0% by weight on a dry weight basis to increase milk production of said dairy cows.

2. The method as claimed in claim 1 in which the feed contains 0.25 to 2.4% by weight of spent sulfite liquor on the dry weight basis.

3. The method as claimed in claim 1 in which the feed contains about 1.8% by weight of spent sulfite liquor on the dry weight basis.

* * * * *